Oct. 19, 1954  W. R. TRAVERS  2,692,081
SUPERCHARGER ARRANGEMENT FOR THERMAL POWER PLANTS
Filed March 24, 1949
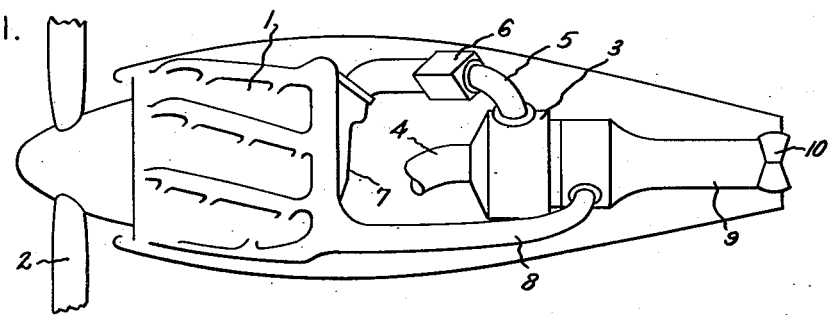
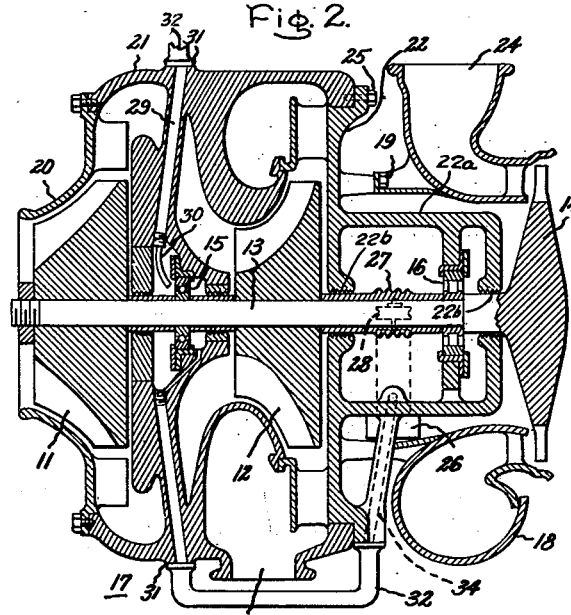
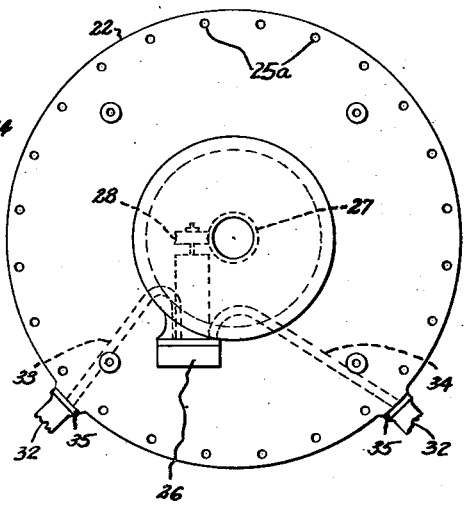
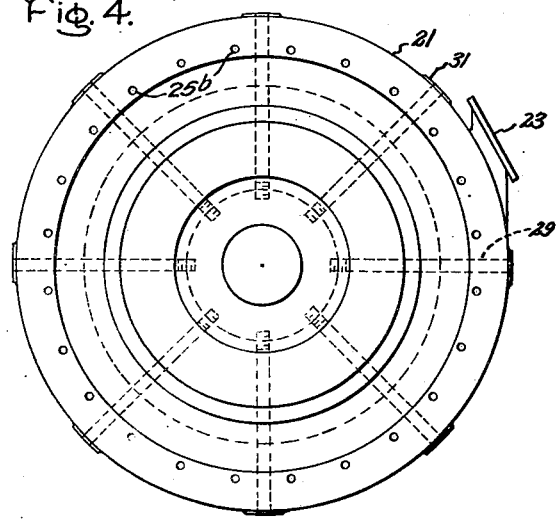
Inventor:
William R. Travers,
by Crowell S. Mack
His Attorney.

Patented Oct. 19, 1954

2,692,081

UNITED STATES PATENT OFFICE 2,692,081

SUPERCHARGER ARRANGEMENT FOR THERMAL POWER PLANTS

William R. Travers, Lynn, Mass., assignor to General Electric Company, a corporation of New York Application March 24, 1949, Serial No. 83,226

1 Claim. (Cl. 230—207)

This invention relates to thermal powerplants and particularly to the kind of supercharger arrangements in which a supercharger is driven by a gas turbine having a nozzlebox receiving gases from the exhaust manifold of an internal combustion engine.

An object of my invention is to provide an improved construction of such supercharger arrangements whereby a standard type of turbosupercharger may be produced for use in connection with various types of combustion engines and whereby the compressor and gas turbine of the turbosupercharger may be easily assembled with different internal combustion engines.

Other objects and advantages will be apparent from the following description taken in connection with the accompanying drawings in which Fig. 1 is a diagrammatic representation of a thermal powerplant including a turbosupercharger arranged in accordance with the invention; Fig. 2 is a sectional view illustrating the turbosupercharger; and Figs. 3 and 4 are detailed views illustrating portions of the compressor casing arrangement.

Referring now to Fig. 1, one type of thermal powerplant used for operating an aircraft may comprise a reciprocating internal combustion engine 1 which is adapted to drive a propeller 2. A turbosupercharger 3 receives air from the ambient atmosphere through a suitable inlet conduit 4 and delivers this air at considerably higher pressure to the engine inlet manifold 7 through conduit 5 and an aftercooler 6 which removes at least a portion of the heat of compression. Exhaust gases from the engine are employed as motive fluid for the turbine and are conveyed from the engine exhaust manifold through conduit 8 to the turbosupercharger turbine which in turn drives the compressor. After expansion through the turbine, the gases are discharged to an exhaust conduit 9 and then to the atmosphere through a variable nozzle 10. The exhausts gases from conduit 9 and nozzle 10 are directed in a rearward direction relative to the flight path of the aircraft so that the reaction force resulting from discharging these gases at high velocity produces a forward thrust on the aircraft.

It will be apparent that the arrangement described constitutes a type of compound engine but not in the sense that this term is normally used in the art. For example, conventional supercharged engines are provided with a geared supercharger within the engine structure, and a carburetor for mixing engine fuel with the engine inlet air before this air is delivered to the inlet manifold of the engine. It has been customary in the past to provide a waste valve or wastegate in conduit 8 between the engine and the supercharger for by-passing unwanted exhaust gas. Furthermore, no variable nozzle was provided in the turbine exhaust conduit. The exhaust gases were merely conducted to a convenient location in the aircraft for exhausting directly to the atmosphere.

In a powerplant of the type described, supercharged air for the engine is provided at a high pressure level, which may be of the order of 80 inches of mercury absolute, to the engine inlet manifold 7 entirely by means of the turbosupercharger 3. No geared blower is provided in the engine, and a fuel injection system is substituted for the conventional carburetor. The powerplant differs further from previous arrangements in that no wastegate is provided in the conduit 8 connecting the engine exhaust manifold to the turbosupercharger 3. In the powerplant described, all of the engine exhaust gas passes through the turbine and the degree of supercharging is controlled by changing the turbine exhaust pressure by varying the degree of opening of adjustable nozzle 10.

As previously indicated, the pressure of the air delivered by turbosupercharger 3 is considerably higher than pressures previously employed. To provide this high pressure air with apparatus of minimum bulk and weight, a two-stage centrifugal type compressor is employed.

Referring now to Fig. 2, first and second stage impellers 11, 12, respectively, are secured to a shaft 13 which is driven by a turbine wheel 14. Shaft 13 is rotatably supported by suitable bearings 15, 16 located in a compressor casing indicated generally at 17. A turbine nozzlebox 18 for receiving engine exhaust gases is secured to the compressor casing 17 by a plurality of threaded fastenings 19.

For assembly reasons and also because of the complexity of the flow path in apparatus of the type described, the compressor casing may comprise a plurality of castings secured together by any convenient securing means to form a single casing member. As illustrated, casing 17 comprises three individual castings, an inlet portion 20 including a diffuser for the first stage, an intermediate portion 21 including the discharge scroll, and a third portion 22 which forms an end wall at the high pressure side of casing 17 as well as a combined bearing and pump housing at 22a, carrying appropriate shaft sealing means such as the labyrinth structure shown diagrammatically at 22b. In addition, casing portion 22 forms the second stage diffuser.

The intermediate portion 21 is provided with a flanged discharge opening 23, communicating with the scroll, to facilitate connection to conduit 5. Likewise, nozzlebox 18 is provided with a flanged inlet opening 24 for connection to conduit 8. With the third compressor casing portion 22 and nozzlebox 18 secured to each other by a plurality of threaded fastenings 19, relative angular positioning of nozzlebox 18 and casing portion 22 is permitted. Intermediate portion 21 is secured to the third casing portion 22 by a plurality of threaded fastenings 25 inserted through appropriate holes 25a into tapped holes 25b thereby also permitting relative angular positioning of casing portions 21 and 22.

A pump is shown diagrammatically at 26, for supplying lubricant to bearings 15, 16 and is of the type having a plurality of individual pumping elements, one of which is utilized for supplying lubricant under pressure to the bearings, while other pumping elements are utilized to scavenge lubricant from the separate enclosures surrounding bearings 15, 16. Multipurpose pumps of this type are commonly used in aircraft practice, e. g. see the diagrammatic disclosure in the patent to Puffer, Number 2,234,777, having the same assignee as this application, but it will of course be obvious that separate supply and scavenging pumps may be employed if desired. A worm 27, carried by shaft 13, meshes with a suitable gear 28, secured to pump 26, so that turbine wheel 14 drives the pump.

With reference to the lubricant supply arrangement, the angular position of pump 26 with respect to casing portion 22 is not critical, but in order to adequately scavenge lubricant from bearings 15, 16 the pump must be located in the lowest possible position. No particular problem is encountered with respect to lubrication and scavenging of bearing 16 mounted in housing 22a and in appropriate communication (not shown) with pump 26 for lubrication and scavenging purposes, when it is desired to connect the turbosupercharger with a different power-plant since, as already indicated, casing portion 22 and nozzlebox 18 may be positioned relative to one another. A very difficult problem is encountered, however, with respect to scavenging lubricant from the lowest point adjacent bearing 15. To overcome this problem, I provide a plurality of passages 29 in casing member 21. As illustrated in Fig. 4, eight equally spaced passages are provided, but it will be obvious that a greater or smaller number of passages may be employed in accordance with the degree of adjustment desired. Passages 29 connect the exterior of the casing to the interior portion in which bearing 15 is located. The interior end portion of each of these passages is provided with a threaded portion for receiving a nozzle 30 which directs lubricant to bearing 15. At each of the exterior end portions, a boss 31 is provided to facilitate connection to an external conduit portion 32. At least two passages 33, 34 are provided in casing portion 22 having exterior end portions provided with similar bosses 35. The exterior end portions of passages 33, 34 are spaced with approximately the same angular spacing as that of passages 29 to facilitate connection to external conduits 32 and to minimize the length thereof. However, the angular spacing of passages 33, 34 may differ from that of passages 29, if desired. In such case, external conduits 32 merely have different lengths.

My improved supercharger arrangement is assembled in the following manner: Nozzlebox 18 is secured to casing portion 22 by threaded fastenings 19 with inlet 24 in the desired relation to pump 26. One of the passages 33, 34, for example, passage 33, is connected to the supply element of pump 26. Casing portions 21, 22 are secured together by threaded fastenings 25 with discharge opening 23 in the desired location relative to inlet 24 and pump 26. External conduit 32 is secured to bosses 31, 35 to connect passage 33 with one of the passages 29. Nozzle 30 for directing lubricant to bearing 15 is connected to the interior end portion of this particular passage 29. Since a plurality of passages 29 are provided, it is possible by selection to obtain at least one of these passages which has its interior end portion located at or substantially at the lowest point in the vicinity of bearing 15. This latter passage 29 is connected to passage 34 by another external conduit 32 as shown in Fig. 2, in the manner previously described for the supply conduit. The remaining unused passages 29 are blocked off by suitable plates (not shown) secured to bosses 31. When a different relationship of openings 23 and 24 relative to pump 26 is desired, adequate lubrication and scavenging of bearing 15 is assured merely by selecting a different pair of passages 29, one of which communicates with the lowest point in the vicinity of bearing 15 for scavenging.

The number of threaded fastenings 25 is preferably a multiple of the number of fastenings 19 to permit relationship of inlet and discharge openings of the compressor and turbine to be varied to a greater or lesser degree according to the angular spacing between adjacent fastenings 19, 25.

Thus it will be seen that my invention provides an improved construction of casing arrangement for rotating apparatus whereby various casing portions may be readily adjusted as regards relationship of openings provided in the various casing portions and at the same time adequate lubrication and scavenging of bearings are provided.

While a particular embodiment of the invention has been illustrated and described, it will be apparent to those familiar with the art that various changes and modifications may be made without departing from the invention, and it is intended to cover in the appended claim all such changes and modifications that come within the true spirit and scope of the invention.

What I claim as new and desire to secure by Letters Patent of the United States is:

A supercharger arrangement including a centrifugal compressor having first and second casing portions, first and second bearings mounted in said first and second casing portions respectively, a rotor including first and second impellers rotatably supported by said bearings, said first bearing being disposed between said impellers, means for connecting said casing portions together in a plurality of positions with respect to each other, pumping means secured to said second casing portion for supplying liquid lubricant under pressure to and for scavenging said lubricant from said bearings, said first casing portion having more than two equally spaced passageways having communication with said first bearing at points adjacent thereto and extending outwardly to the periphery of said first casing portion, lubricant supply means including a first conduit connecting said pumping means with one of the said passageways, and means including a second conduit connecting said pumping means with another of the said passageways having communication with said first bearing at the lowermost point thereto, whereby adequate scavenging of said first bearing is secured irrespective of the relative position of said first casing portion with respect to said second casing portion.

References Cited in the file of this patent

UNITED STATES PATENTS

| Number | Name | Date |
|---|---|---|
| 656,023 | Keeney | Aug. 14, 1900 |
| 2,117,131 | Auger | May 10, 1938 |
| 2,190,670 | Mann | Feb. 20, 1940 |
| 2,216,731 | Birmann | Oct. 8, 1940 |
| 2,234,777 | Puffer | Mar. 11, 1941 |
| 2,406,388 | Larrecq | Aug. 27, 1946 |